United States Patent Office 3,574,780
Patented Apr. 13, 1971

3,574,780
METHOD FOR PRODUCING ISOPRENE
Yoshihiro Watanabe, Kobe, Jiro Kobayashi, Takatsuki-shi, Yoshiki Toyoshima, Niihama-shi, and Masatosi Saito, Ichihara-shi, Japan, assignors to Sumitomo Chemical Company, Ltd., Osaka, Japan
No Drawing. Filed Aug. 8, 1969, Ser. No. 848,726
Int. Cl. C07c 1/20; B01i 11/06
U.S. Cl. 260—681
5 Claims

ABSTRACT OF THE DISCLOSURE

Isoprene is produced by contacting at an elevated temperature a gaseous mixture containing tert-butyl methyl ether and oxygen with a suitable catalyst containing, as at least one component, a compound comprising oxygen and one or more members selected from the group consisting of molybdenum, vanadium, tungsten and uranium.

---

This invention relates to a novel process for producing isoprene by contacting with a suitable catalyst a gaseous mixture containing oxygen and tert-butyl methyl ether [$(CH_3)_3COCH_3$; hereinafter abbreviated as "TBME"].

Isoprene is a useful compound as a starting material for synthetic rubbers, polyisoprene rubbers and copolymer rubbers which are under development in recent years, and the establishment of an economical production process thereof has been desired.

The present inventors have found an advantageous isoprene synthesis process, in which a gaseous mixture containing TBME and oxygen is contacted with a solid catalyst to produce isoprene directly.

More particularly, the invention is concerned with a process for producing isoprene directly by contacting a gaseous mixture containing TBME and oxygen in a suitable ratio with a solid catalyst containing, as at least one component, a compound comprising oxygen and one or two or more members selected from the group consisting of molybdenum, tungsten, vanadium and uranium.

TBME, which is a starting material employed in the present invention, can be easily prepared by reacting isobutylene with methanol in a liquid or gas phase in the presence of a suitable catalyst. For example, a mixture comprising isobutylene, methanol and a small amount of sulfuric or phosphoric acid is heated at about 100° C. under a pressure necessary for maintaining the mixture in a liquid phase, whereby TBME can be obtained in a high yield. On the other hand, U.S. Pat. 3,135,807 (1964), for example, teaches that a gaseous mixture containing substantially equimolar amounts of isobutylene and methanol is passed, at a temperature of 110° C. under a pressure of 15 kg./cm.$^2$, through a solid catalyst having a composition of $MoO_3$—$Bi_2O_3$—$SiO_2$, whereby TBME can be obtained substantially quantitatively with a conversion of 50%.

It is not always necessary to use pure isobutylene for the synthesis of TBME, because methanol reacts selectively with only isobutylene in the $C_4$-mixture obtained by thermal cracking of naphtha. Boiling point of the TBME is higher than that of unreacted substance and hence TBME can be easily separated therefrom by simple distillation.

Methanol and TBME form an azeotropic mixture and it is difficult to separate completely TBME from methanol by simple distillation. However, production of isoprene of the present invention is not disturbed by the presence of methanol and it is not necessary to use TBME completely free from methanol. Thus, in the present invention, the starting material TBME can not only be easily obtained from an industrially inexpensive $C_4$-mixture and methanol, but also can be used without any particular purification. These points are extremely advantageous from the point of view of the costs of starting materials.

As the oxygen source, any oxygen-containing gas may be used. Ordinarily, however, air is used as an inexpensive oxygen source. The mixing ratio of oxygen to TBME is not irrelevant to the yield of isoprene but can be selected considerably freely.

If necessary, sometimes other inert gases, for example, steam, carbon dioxide etc. can be used like as nitrogen in order to control the reaction conditions.

Catalysts usable in the present invention are those which contain, *as at least one component*, a compound comprising oxygen and one or more members selected from the group consisting of tungsten, vanadium, molybdenum and uranium (such catalysts will be referred to as "catalysts A," hereinafter). Examples of the catalyst (A) include tungsten (IV, VI) oxide, vanadium (II, III, IV, V) oxide, molybdenum (IV, VI) oxide, uranium (IV, VI) oxide and the like.

Starting materials for preparing catalyst (A) are those shown above or substances capable of being converted into the catalysts (A) by thermal decomposition, such as for example, ammonium heptamolybdate, molybdic acid, ammonium metavanadate, ammonium tungstate, uranyl nitrate and uranyl acetate.

In addition to said *main components*, promotors may be added in order to inhibit side reactions and to increase selectivity. For example, compounds of phosphorus, sulfur, boron, antimony, bismuth, tellurium, silver, barium, calcium, magnesium, potassium and sodium are effective for said purpose. (Catalysts incorporated with these promotors will be referred to as "catalysts B," hereinafter). The proportions of the above-mentioned elements in the catalysts can be optionally selected, though said proportions are not irrelevant to conversion and selectivity.

These catalysts A and B may be used after shaping by compression, calcination and the like procedures, without using any carriers or in a state supported on carriers. As the carriers, molten or semi-molten titanium oxide, zinc oxide, tellurium oxide, alumina and active carbon pumice are ordinarily used. Especially a compound of silicon and oxygen (C) (such as silica gel) is preferable as the carrier. Among the above-mentioned catalysts (A), there are some which display marked isoprene-forming ability only when used in combination with the compound (C). Such synergistic effect is observed not only in the case where the catalysts (A, B) are supported on the compound of silicon and oxygen, but also in the case where the catalysts (A, B) and the compound (C) are individually finely-divided and finely mixed together, and the mixture is compressed for use as a catalyst; and also in the case where a catalyst is prepared by gelling the catalysts (A, B) together with a silica sol in the form of a colloidal dispersion, followed by calcination.

There is a maximum value in isoprene yield depending on the mixing ratio of (A, B) to (C) in the catalyst employed, and the properties and kinds of the starting materials (A, B) and (C), and can be selected from the range of 1:99 to 99:1. Generally, a range of from 5:95 to 95:5 gives favorable results.

In order to further enhance the above-mentioned effect, the present inventors studied the influence of the compound (C). As the result, the inventors have found that when silica gel is to be used as a starting material, the use of silica gel having a surface area of less than 350 m.$^2$/g. can greatly increase the isoprene selectivity.

It is well known, in general, that even in the case of substances comprising silicon and oxygen, the physical and chemical properties thereof are markedly complex, and that they delicately vary in surface area, average pore diameter, water content, intensities and kinds of acid sites, depending on differences in preparation conditions.

Especially the surface area of silica gel employed as a starting material has an important influence on isoprene selectivity, and use of a silica gel small in surface area is preferred.

In the next place, the promotors employed in the present process will be explained.

In case the promotors are phosphorus compounds, the catalysts may be prepared, for example, either by mixing phosphomolybdic acid, vanadium phosphate or phosphotungstic acid with silica gel, or by mixing molybdenum trioxide and a suitable amount of phosphoric acid with silica gel. By addition of phosphorus or a compound of phosphorus and oxygen, the isoprene selectivity based on isobutylene and the amount of isoprene produced per unit volume, time of catalyst are increased, and the deposition of carbon on the catalyst surface is inhibited.

Sulfur or sulfur compounds also display substantially the same effect as that of phosphorus. In addition thereto, boron or a compound comprising boron and phosphorus, e.g. boron phosphate, shows substantially the same effect. In addition to such substances as phosphorus, sulfur and boron which give acidic properties, there may be used, as promotors, such substances which conversely give basic properties, e.g. compounds of alkali or alkaline earth metals such as sodium, potassium, calcium, barium and magnesium. These substances, when added in small amounts, have actions to increase the isoprene selectivity. Further, tellurium, antimony or bismuth, when incorporated in a small amount, displays an action to make catalyst activity extremely mild, and hence can be used as an activity-controlling agent.

The contact time employed in the present process can be selected from such an extremely wide range as from 0.1 to 100 seconds. The optimum contact time varies depending on the kind of catalyst and the composition of starting gas, but a contact time within the range of 0.5 to 30 seconds gives favorable results, in general.

The reaction temperature also varies depending upon the kind of the catalyst employed and the composition of the starting gas. If the temperature is excessively low, the reaction rate becomes insufficient, while if the temperature is excessively high, the isoprene selectivity is lowered. Generally the reaction temperature is 100°–500° C., preferably 150°–350° C.

The reaction according to the present process may be effected under any of reduced or pressurized conditions. However, the reaction is carried out rather preferably under pressurized conditions.

The catalyst bed employed in the present process may be any type of a fixed bed or of a fluidized bed.

The reaction product comprises, in addition to isoprene, isobutylene and methyl alcohol which are decomposition products of TBME, and a small amount of formaldehyde and unreacted TBME. The catalyst of the present invention can be used in the production of isoprene by reaction of formaldehyde and isobutylene or of methanol, oxygen and isobutylene, therefore after separation of the isoprene, the isobutylene, methyl alcohol and formaldehyde, which are in a mixed state, can be recycled to the reactor together with freshly fed TBME and oxygen (or air).

In the isoprene synthesis reaction according to the present invention, the ratio of oxygen to TBME is very important, as seen also in Example 7 set forth later. If the amount of oxygen is too much, a complete combustion of TBME is greatly progressed and the yield of isoprene is markedly lowered, as this is naturally anticipatable. If the amount of oxygen is too small, isobutylene and methanol are formed mainly and the yield of isoprene is lowered. Employment of decreased amount of oxygen results in formation of a mixture of isobutylene and methanol which contains small amounts of isoprene and formaldehyde. This phenomenon suggests a novel and advantageous process for inexpensively separating isobutylene through TBME from a mixed $C_4$-fraction. However, so far as the process is deemed as an isoprene synthesis process, the $O_2$/TBME ratio is preferably about 0.2–1.5 (molar ratio).

The present invention will be illustrated below with reference to examples. Definitions of the yields and recovery ratios shown in the examples are as follows:

Isoprene yield (percent)
$$= \frac{\text{(Mole of formed isoprene)}}{\text{(Mole of fed TBME)}} \times 100$$

Formaldehyde yield (percent)
$$= \frac{\text{(Mole of formed formaldehyde)}}{\text{(Mole of fed TBME)}} \times 100$$

TBME conversion (percent)
$$= \frac{\text{(Mole of fed TBME)} - \text{(Mole of recovered TBME)}}{\text{(Mole of fed TBME)}} \times 100$$

Isobutylene recovery ratio (percent)
$$= \frac{\text{(Mole of recovered isobutylene)}}{\text{(Mole of fed TBME)}} \times 100$$

Methyl alcohol recovery ratio (percent)
$$= \frac{\text{(Mole of recovered methyl alcohol)}}{\text{(Mole of fed TBME)}} \times 100$$

EXAMPLES 1–4

Molybdenum trioxide, vanadium pentoxide, tungsten trioxide, uranium trioxide and a silica catalyst (N 608, a product of Nikki Kagaku K.K.) were finely divided to less than 100 mesh. The individual metal oxides and the silica catalyst were thoroughly mixed in such ratios as set forth in Table 1, in the presence of a small amount of water. Each of the thus obtained mixtures was compression-molded into tablets, was fired at 400° C. for 8 hours, and was then ground to 12–16 mesh to prepare a catalyst.

15 ml. of the thus prepared catalyst was charged into a quartz reaction tube of 15 mm. in inner diameter, and oxidation was effected, while introducing a starting gas comprising 28% by volume of TBME and 72% by volume of air, at such a temperature as shown in Table 1 and substantially at atmospheric pressure for a contact time of 10 seconds.

The resulting gas was passed to a trap maintained at −70° C., and a liquid condensate and a non-condensate were subjected to measurement in amount and to analysis according to gas-chromatography, respectively, to calculate the amounts of reaction products and unreacted substances. The results were as shown in Table 1.

TABLE 1

| Example | Catalyst composition | Reaction temperature (° C.) | Isoprene yield | TBME conversion | Isobutylene recovery ratio | Methyl alcohol recovery ratio |
|---|---|---|---|---|---|---|
| 1 | $MoO_3$:$SiO_2$ (1:2) | 250 | 10.3 | 97.8 | 77 | 60.6 |
| 2 | $V_2O_5$:$SiO_2$ (1:5) | 230 | 8.5 | 98.5 | 78 | 51.5 |
| 3 | $WO_3$:$SiO_2$ (1:1) | 250 | 7.0 | 97.0 | 77 | 62.2 |
| 4 | $VO_3$:$SiO_2$ (1:2) | 270 | 8.5 | 97.0 | 80 | 57.1 |

EXAMPLE 5

1.5 g. of phosphoric acid, 23 g. of molybdenum trioxide, 6 g. of concentrated nitric acid and 58 g. of bismuth nitrate [$Bi(NO_3)_3 \cdot 5H_2O$] were dissolved in 60 g. of water. This solution was added to 80 g. of a silica sol (Snowtex 5 produced by Nissan Kagaku K.K.; $SiO_2$ content 32%), and the mixture was stirred by means of a mixer and was then vaporized to dryness over a water bath. Subsequently, the mixture was fired at 600° C. for 5 hours and was then ground to 12–16 mesh to prepare a catalyst.

15 ml. of the thus prepared catalyst was charged into a quartz reaction tube, and oxidation was effected, while introducing a starting gas comprising 20% by volume of TBME and 80% by volume of air, at a temperature of 260° C. and substantially at atmospheric pressure for a contact time of 10 seconds. The product was quantitatively analyzed in the same manner as in Example 1 to obtain the following results:

| | Percent |
|---|---|
| Isoprene yield | 16.8 |
| TBME conversion | 97.6 |
| Isobutylene recovery ratio | 69.1 |
| Methyl alcohol recovery ratio | 58.5 |

EXAMPLE 6

121 g. of bismuth nitrate [$Bi(NO_3)_3 \cdot 5H_2O$] was dissolved in a solution comprising 600 cc. of water and 50 cc. of concentrated nitric acid to form an aqueous bismuth nitrate solution. Separately, 62.5 g. of tungstic acid and 14.7 g. of ammonium molybdate were dissolved in a solution comprising 100 cc. of 28% ammonia water and 500 cc. of water to form a solution. The two solutions thus formed were quickly mixed with each other to deposit a precipitate, and the mixed solution was adjusted to pH 5 by use of nitric acid and ammonia water. The precipitate was water-washed and filtered, and the resulting cake was thoroughly kneaded with 270 g. of a silica sol (Snowtex N produced by Nissan Kagaku K.K.; $SiO_2$ content 30%). Subsequently, the mixture was vaporized to dryness over a water bath at 100° C. and was then fired at 500° C. for 6 hours to prepare a catalyst containing Mo, W, Bi and Si.

The thus prepared catalyst was ground to 12–16 mesh, and 20 cc. of the ground catalyst was charged into an SUS-made, U-shaped reaction tube of 18 mm. in inner diameter and was heated over a salt bath at 280° C. To the above-mentioned catalyst layer was passed at atmospheric pressure for a contact time of about 4 seconds a starting gas comprising 20% of TBME, 20% of isobutylene and 60% of air. The product was quantitatively analyzed in the same manner as in Example 1 to obtain the following results:

| | Percent |
|---|---|
| Isoprene yield | 26.0 |
| TBME conversion | 99.5 |
| Methyl alcohol recovery ratio | 49.8 |

EXAMPLE 7

Catalyst employed: $MoO_3 \cdot 0.5V_2O_5 \cdot 6WO_3 \cdot 3Bi_2O_3/SiO_2$ (30% W).
Salt bath temperature: 270° C.
SV: 1000/hr.

Under the above conditions and while varying the amount of oxygen, the same operations as in Example 1 were effected to obtain the results shown in the following table:

| | Percent | | | | |
|---|---|---|---|---|---|
| $O^2$/TBME | TBME conversion | Isoprene yield | Formaldehyde yield | Isobutylene recovery ratio | Methyl alcohol recovery ratio |
| 0 | 100 | 0 | 0 | 94.0 | *95.3 |
| 0.35 | 100 | 40.7 | 19.5 | | |
| 0.52 | 100 | 34.8 | 24.1 | | |
| 0.70 | 100 | 17.3 | 52.9 | | |

*NOTE.—The mark * shows that the salt bath temperature was 150° C.

In each of the above reactions, $N_2$ was made present in an amount of about 4 times the mole of $O_2$.

What we claim is:

1. A process for synthesizing isoprene which comprises contacting at an elevated temperature a gaseous mixture containing tert-butyl methyl ether and oxygen with a solid catalyst containing, as at least one component, a compound comprising oxygen and one or more members selected from the group consisting of molybdenum, vanadium, tungsten and uranium, wherein the molar ratio of oxygen to tert-butyl methyl ether is within the range of from 0.2 to 1.5.

2. A process according to claim 1, wherein the mixed gas containing tert-butyl methyl ether and oxygen is incorporated with isobutylene and methanol which have been formed as by-products in the preceding reaction.

3. A process according to claim 1, wherein as a carrier for the catalyst is used a substance composed mainly of silicon and oxygen.

4. A process according to claim 1, wherein the reaction is effected at a temperature within the range of from 150° C. to 350° C.

5. A process according to claim 1, wherein the tert-butyl methyl ether is obtained in such a manner that isobutylene contained in a mixed $C_4$-fraction is allowed to react with methanol to form tert-butyl methyl ether, which is then separated from other $C_4$-fractions.

References Cited

UNITED STATES PATENTS

| | | | |
|---|---|---|---|
| 3,146,278 | 8/1964 | Habeshaw et al. | 260—681 |
| 3,253,051 | 5/1966 | Yanagita et al. | 260—681 |

DELBERT E. GANTZ, Primary Examiner

G. E. SCHMITKONS, Assistant Examiner

U.S. Cl. X.R.

252—437; 260—682